July 18, 1961     E. M. MAXEY     2,992,957
RUBBER ARTICLES RESISTANT TO OIL
Filed Jan. 4, 1956
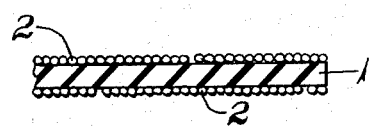
FIG. 1
FIG. 2
FIG. 3
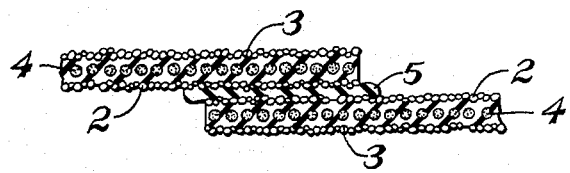
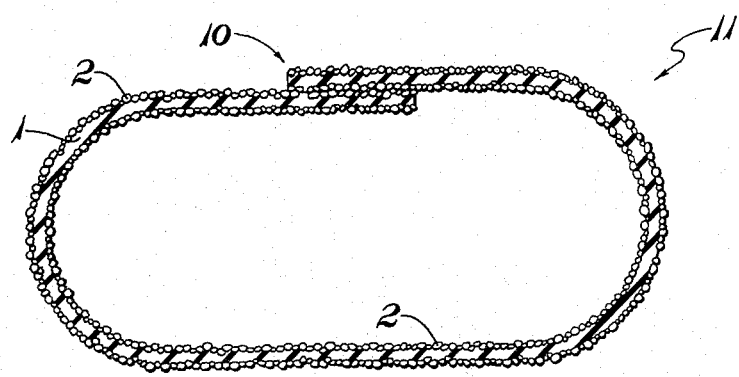
FIG. 4
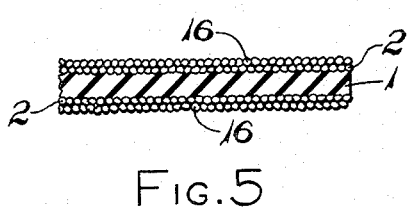
FIG. 5
INVENTOR.
EDWIN M. MAXEY
BY
ATTY.

United States Patent Office 2,992,957
Patented July 18, 1961

2,992,957
RUBBER ARTICLES RESISTANT TO OIL
Edwin M. Maxey, Stow, Ohio, assignor to The B. F. Goodrich Company, New York, N.Y., a corporation of New York
Filed Jan. 4, 1956, Ser. No. 557,413
8 Claims. (Cl. 154—116)

This invention relates to a novel method for protecting the surface of a fuel-resistant rubbery material from oxidation and for maintaining the adhesive properties of such surface and to a novel surface protected fuel-resistant rubbery material. More specifically, the present invention relates to a method for providing the surface of a nitrile rubber with a coating characterized in that it resists oxidation of the surface of the rubber and yet does not interfere with the adhesive properties of the surface of the rubber, to a method for adhering such coated nitrile rubbers together and to the articles resulting from the practice of said methods.

It is an object of the present invention to provide a method for protecting the surface of a fuel-resistant rubber so that it can readily be removed from curing liners without damage and for protecting it from oxidation without detracting from the inherent adhesive characteristics of said rubber.

Another object is to provide a method for adhering together fuel-resistant rubbery compositions to provide articles of manufacture including laminates in which the surfaces of said compositions are protected from oxidation without impairment of the adhesive properties of said surfaces and without the necessity for specially treating said surfaces prior to joining them together and in which the bonds joining the various laminates are strong and fuel-resistant.

A further object is to provide a fuel-resistant rubber composition having a surface of which at least a portion resists oxidation but which will readily form on curing with other materials a strong adhesive bond resistant to the action of fuels.

A still further object is to provide articles of manufacture including laminates of fuel-resistant rubbery compositions having strong, tough and flexible gasoline-resistant bonds or seams securing said compositions together and having surfaces which resist oxidation.

These and other objects and advantages of the present invention will become more apparent to those skilled in the art from the following detailed description, examples and drawing wherein:

FIG. 1 is a sectional view of an uncured sheet of a fuel-resistant rubber containing a relatively thin particulate coating to resist oxidation without impairing the adhesion of the rubber;

FIG. 2 is a sectional view similar to FIG. 1 in which the rubber has been cured;

FIG. 3 is a sectional view of an embodiment of the present invention utilizing the sheet shown in FIG. 2;

FIG. 4 is a sectional view partly in perspective of another embodiment of the invention utilizing the material shown in FIG. 1; and FIG. 5 is a sectional view similar to FIG. 1 in which the coating comprises substantially layers of different kinds of particles.

It has now been discovered according to the present invention that fuel-resistant rubbery materials having an adherent, relatively thin coating of a finely-divided or particulate polymer containing predominantly a haloethylene can readily be released from molds or curing liners without sticking to the same and without marring the surface of the rubber. The coated rubber article does not exhibit any appreciable surface oxidation and can be easily cured or bonded to itself to provide a strong bond which is not weakened on extended contact with gasoline or oil or their vapors.

Moreover, the cured coated rubbers of this invention can also be bonded easily to each other by means of an intermediate rubber layer, generally of the same type of rubber as in the cured coated rubbers, which is cured in adhesive relation to the other cured coated rubbers. The intermediate rubbery material need not be surface coated. This latter composite article also exhibits a strong adhesive bond, its surface is not readily oxidized, and the bond is not weakened, or the layers of the laminate do not separate, after long contact with gasoline and oil.

As shown in the drawing, FIG. 1, sheet of fuel-resistant rubber composition 1 has been coated with thin, substantially continuous layer 2 of finely-divided particles of a haloethylene polymer. In FIG. 2, fuel-resistant rubber sheet 1 has been cured and during the curing process haloethylene polymer particles 2 have become secured to the surface or outer surface layers 3 of the rubber sheet. A composite article is shown in FIG. 3 where cured coated sheets similar to that shown in FIG. 2, but containing fabric reinforcement 4, have been joined together by curing, such as using an electronic sealing device, by means of interposed layer 5 of a highly accelerated fuel-resistant rubber composition. FIG. 4 discloses a single ply hose structure in which the uncured coated sheet has been lapped at 10 to itself along the sides to form tube 11 and then cured while in FIG. 5 the coated rubber sheet has been coated with another layer 16 of a finely-divided material similar to layer 2.

The fuel-resistant rubbery material which is coated with a haloethylene polymer can be a nitrile rubber, polymers containing chlorobutadiene-1,3, "Thiokol" rubber (polysulfide rubber), polyester rubber, i.e., one of the polyacrylates, or "Vulcaprene" rubber (polyester amide).

However, it is much preferred to use a nitrile rubber as the fuel-resistant rubber layer since it not only resists the action of oils and aliphatic fuels but also those aliphatic fuels containing an appreciable amount, up to about 20–40%, of aromatics and since it is more compatible with the haloethylene containing polymer. The nitrile rubber used is a copolymer of an open-chain diene hydrocarbon having from 4 to 8 carbon atoms and an acrylic nitrile. Examples of useful open-chain dienes are butadiene-1,3, isoprene, 2-3-dimethyl butadiene-1,3, 1,4-dimethyl butadiene-1,3, 1,5-pentadiene, methyl pentadiene, and the like and mixtures thereof. Open-chain conjugated diene hydrocarbons having from 4 to 8 carbon atoms such as butadiene-1,3 are preferred. One or more acrylic nitrile monomers copolymerizable with the diene hydrocarbon monomers can be acrylonitrile, methyl acrylonitrile, ethyl acrylonitrile, chloroacrylonitrile and the like. Acrylonitrile is the preferred monomer to employ. Moreover, the diene-acrylic nitrile copolymer can contain in minor amounts one or more copolymerizable monomers which do not detract from the gasoline resistant properties of the copolymer but which may improve its physical or processing properties such as methyl acrylate, ethyl acrylate, methyl methacrylate, ethyl methacrylate, methacrylic acid, 2-vinyl pyridine, methyl vinyl ketone, vinylidiene chloride, styrene, chlorostyrene and the like. The diene-acrylic nitrile copolymers will contain from about 35 to 90% by weight, preferably from about 55 to 85% by weight, of the diene and at least about 15% by weight of the acrylic nitrile.

Suitable compounding agents can be employed with the fuel-resistant rubber, such as curing, cross-linking or vulcanizing agents, accelerators, retarders, antioxidants, plasticizers, reinforcing agents, fillers, color pigments, dyes and the like in amounts well known to those skilled in the art, to provide a flexible, strong and tough polymer on curing.

Where two or more sheets of the haloethylene polymer coated fuel-resistant rubber are to be joined together to form a laminate of several plies or a large size composite sheet, they can generally be joined by means of a strip, sheet or layer of the same type of fuel-resistant rubber composition. If the sealing strip is relatively narrow in width and the sheets to be joined are relatively wide or large, it may be desirable to highly accelerate the bonding rubber composition and to use electronic sealing to set off the cure and to complete the cure at room temperature rather than to use large size curing apparatus.

The fuel-resistant rubber sheet is preferably reinforced by means of a layer of fabric disposed interiorly and secured to the rubber mechanically or by adhesives. For example, two layers of the uncured fuel-resistant rubber can be calendered simultaneously or successively on each side of an open-weave fabric so that the rubber of each layer tends to be forced through the openings or pores in the fabric to bind the layers together. The bonding or sealing strip can also be reinforced. If a tight or close weave fabric is desired, it should preferably first be coated with or dipped in an adhesive such as a resorcinol-aldehyde rubber composition or other adhesive to adhere the fabric and rubber together. Other methods for combining the fabric and rubber can be used. Moreover, those fabrics can be used which are not necessarily woven such as weftless fabric, a plurality of cords or yarns, matted or unwoven materials and the like. The fabric can be made of natural or synthetic fibers and yarns, etc. and can be inorganic or organic in nature. Examples of useful fibrous materials are cotton, rayon, jute, nylon, Orlon, Dacron, wool, wood pulp or paper, glass asbestos, brass plated steel, steel, aluminum and the like and mixtures thereof. One or more fabric layers can be employed, and they are used in an amount and of the type which will impart the requisite reinforcement to the finished sheet and which will withstand the curing and heat-sealing, if any, temperatures employed. On the other hand, the fuel-resistant rubbery material is used in a size, thickness etc., necessary to achieve the durability, strength, service and so forth desired in the finished article.

The haloethylene polymers which are used to form a coating on the surface of the fuel-resistant rubbery material include all of the haloethylene polymers composed predominantly of a polymerized haloethylene having from one to two halogen atoms attached to only one of the carbon atoms, such as homopolymers of vinyl chloride, vinyl bromide, vinyl fluoride, vinylidene chloride, vinylidene bromide, vinylidene fluoride and the like and the copolymers or interpolymers of two or more of these monomers. Copolymers or interpolymers made from monomeric mixtures containing at least one haloethylene monomer together with a lesser amount of one or more copolymerizable monolefinic monomers can also be employed. Monoolefinic materials which can be co- or interpolymerized with the haloethylene monomers include vinyl esters such as vinyl acetate, vinyl chloroacetate, vinyl propionate, vinyl chloropropionate, vinyl butyrate, vinyl benzoate, vinyl chlorobenzoate and others; acrylic and alpha-acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; vinyl aromatic compounds such as styrene, dichlorostyrene, vinyl naphthalene and others; alkyl esters of fumaric and maleic acids such as dimethyl maleate, diethyl maleate and others; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and so forth; and in addition other monoolefinic materials such as ethyl methylene malonate, ethylene, isobutylene, trichlorethylene, vinyl pyridine, N-vinyl carbazole, N-vinyl pyrrolidone, and various other readily polymerizable compounds containing a single olefinic double bond, especially those containing the $CH_2=C<$ group. When utilizing copolymers or interpolymers, the proportions of the various monomers in the monomeric mixtures polymerized to give the copolymers may be varied considerably so long as the haloethylene monomer constitutes a major amount by weight of the total. For example, there may be used copolymers of above about 50 to 99%, preferably from about 70 to 95%, by weight of the haloethylene monomer, together with from about 1 to below 50%, preferably from about 5 to 30%, by weight of a vinyl ester, an acrylic or methacrylic ester or any of the other copolymerizable monoolefinic materials mentioned above, or any two, three, four or more of these. Tripolymers of from above about 50% to 90% by weight of vinyl chloride, from 5 to 45% by weight of vinylidene chloride, and from 5 to 45% by weight of a vinyl ester such as vinyl acetate or vinyl benzoate or an acrylic or methacrylic ester are examples of vinyl halide polymers that may be used. Of the various polymers disclosed herein, those composed of vinyl chloride, vinylidene chloride, and of a major amount of vinyl chloride and a minor amount of vinylidene chloride are preferred. Blends or mixtures of the aforementioned homopolymers, copolymers, interpolymers and so forth can also be used.

The haloethylene polymer can contain one or more stabilizers such as the alkaline earth silicates, basic lead carbonate, barium ricinoleate, lead oxide, lead silicate, lead stearate, lead phenolate, titanium dioxide and the like. Other common compounding ingredients also can be incorporated into the polymer such as fillers, color pigments, and the like. While it is a feature of the present invention that the polymer preferably does not contain a plasticizer or is not plasticized, the polymer can be plasticized if desired. Examples of suitable plasticizers are butyl benzyl phthalate, dicapryl phthalate, dioctyl azelate, dioctyl adipate, dioctyl sebacate, dioctyl phthalate, dibutyl phthalate, dibutoxy ethyl phthalate, dibutyl sebacate, octyl diphenyl phosphate, tricresyl phosphate, tributoxyethyl phosphate, copolymers of butadiene-1,3 and acrylonitrile, and so forth. Other plasticizers which can be employed are hexachlorodiphenyl oxide, toluene sulfonamide-aldehyde resin and a composition comprising a water-insoluble thermoplastic cellulose ether, di(4-tertiary butyl phenyl) monophenyl phosphate and di(4-tertiary butyl phenyl) mono (5-tertiary butyl-2-xenyl) phosphate. Still other plasticizers for haloethylene containing polymers well known to the art such as polyesters can be used. Mixtures of plasticizers can be used. These various compounding ingredients are generally used in minor amounts by weight as compared to the haloethylene containing polymer and can be compounded with said polymer by known methods.

The haloethylene polymer, compounded or not, is used in a finely-divided or particulate form such as a dust, powder and so forth and preferably essentially dry. It is not desired to use large particles such as granules, pellets and so forth which would tend to penetrate deeply into the rubbery material. Likewise, the finely-divided haloethylene polymer should form a relatively thin, uniform coating on the surface of the rubbery polymer and preferably the coating should not be more than a few particles thick and apparently should be complete or substantially complete or continuous to protect the rubbery material from oxidation.

In practicing the methods of the present invention, a fuel-resistant rubbery composition is prepared by mixing together the rubber, curing agent and any other conventional compounding ingredients in a Banbury mixer, on the rolls of a rubber mill, or by latex blending and subsequent drying. The rubber composition is then sheeted out and coated with a thin layer of finely-divided particles of the haloethylene containing polymer. If it is desired to reinforce the rubber, it can be calender coated, or separate sheets of the rubber can be calendered, onto each side of a fabric web or sheet, such as an open weave fabric.

The dusting of the rubber can be accomplished by sprinkling, using a doctor blade, spraying or other operation to provide a relatively thin layer on the surface of rubber. As an alternative the curing liner can be dusted. After dusting or coating the surface of the rubber with a thin coating of particles of one haloethylene containing polymer, for example polyvinyl chloride, the coated rubber can be redusted or coated with a thin layer of another haloethylene containing polymer such as polyvinylidene chloride to provide more than one layer on the rubber of different polymers although the same polymer can be used. Moreover, one fuel-resistant rubber can be coated with one type of haloethylene containing polymer and then cured to another sheet of said rubber containing a different haloethylene containing polymer disclosed herein. Layers of different fuel-resistant rubbers may also be used. Of course, it will be apparent that, if it is known beforehand what areas are to be bonded together or to be protected, it will only be necessary to dust those areas, the remaining areas of the sheet of fuel-resistant rubber can then be covered with Holland cloth, a smooth nonadhering polyethylene sheet or other liner. However, this entails additional operations or steps and, accordingly, it is preferred to dust the entire article, especially since dimensions and sizes of the resulting article may have to be varied according to subsequent manufacturing requirements.

After the rubber has been coated, it can be wrapped around a bar or mandrel interleafed in a liner with the edges overlapping, tightly wrapped to secure the edges in position and cured. If a liner is used which is not smooth-surfaced, the normal temperature during this curing step should be below the fusing point of the haloethylene plastic material to prevent the plastic from fusing and adhering the cured rubber layer to the liner. Alternatively, the lapped edges can be sealed partially with an electronic sealer or heated press or bar and then the remainder of the rubber cured in the conventional manner. In place of using a sheet of rubber, a thin tape can be made or slit from the rubber sheet, dusted, and spirally wound on a mandrel with edges overlapping to form a tube and then cured. Butt end splices can be made using the coated rubber of the present invention if it is desired to make belts, and so forth. Curing can be conducted in molds if desired.

Where some time may elaspe before further manufacturing operations are accomplished and where large objects are being fabricated, the coated fuel-resistant rubber sheets can be cured by tension winding them between nylon or other liners and curing under pressure. On unwinding the assembly the haloethylene polymer coated sheets readily separate from the nylon liners and can then be joined along their edges or cut into panels and joined along the edges of the panels by means of an interposed bonding layer or strip of a highly accelerated fuel-resistant rubber composition generally of the same type as the panels being joined. In such bonding step it is not necessary to first coat the surfaces of the uncured rubber strip, or to further coat the cured panels, with particulate haloethylene containing polymer nor to buff the cured surfaces before bonding. All that is required is to assemble the panels in the desired position with an intermediate uncured highly accelerated rubber strip and seal along the bonded area using an electronic sealer or heat sealing bar. After the electronic sealer has started the cure, the sealer can be removed and the bonding strip permitted to cure at room temperature. The initial temperature produced by the heat sealing bar is sufficient to flow or fuse the haloethylene plastic to permit it to flow and to initiate cure of the intermediate strip and thereby provide a satisfactory seam. Other sealing means, of course, can be used. In place of a layer or strip of curable rubber composition, an adhesive or cement of the same rubber can be applied to the cured coated sheet or sheets in the areas to be joined. However, it is preferable to use a curable rubber strip instead of an adhesive, for when a curable rubber strip is employed, there is less likelihood of the sheets separating during curing, no appreciable swelling of the rubber sheets occurs and the time required for setting up and curing is shorter. Moreover, if the sheets were cured in a liner having a rough surface, i.e., in a woven fabric liner, the liner will impart a pattern or rough surface to rubber and the use of a rubber strip is preferable since several coats of adhesive may be required to smooth out the rough surface. Moreover, it is apparent that other acceleration systems can be used which operate at lower temperatures and do not require the high temperature of the electronic sealer. However, the use of high acceleration is preferred in order to reduce the total curing time.

The particulate haloethylene polymer coated and cured fuel-resistant rubber materials of the present invention can readily be removed from their curing liners after curing without sticking or injuring the surface of the coated sheet and are unaffected by gasoline or oil. They have oxidation resisting surfaces of a continuous or substantially continuous coating of the haloethylene polymer and may be stored for considerable periods of time prior to use. Moreover, the cured coated materials do not need to be buffed to remove talc, or soapstone and/or oxidized rubber and the like and then quickly coated with cement, or treated with solvents to tackify the surface, before being united to each other by curing. All that is required to adhere two layers of the cured coated sheets is to use an intermediate uncured fuel-resistant rubber composition and then cure the layers together. The composite article containing the intermediate strip exhibits a bond or seam which is as strong as or stronger than the layers of the coated rubbers and which also is not affected by gasoline or oil. The bond produced by the method of the present invention also is as strong as one obtained when two uncured sheets free of oxidized film and release agents are cured together. Furthermore, when the bonded sheets of the present invention are reheated along the area of the bond, the sheets do not soften or separate which indicates that the bond is apparently not thermoplastic.

While the articles prepared by the methods of the present invention will have utility in the fabrication of diaphragms for gasoline storage tanks to prevent the evaporation or escape of vapors, they will also find utility in fuel cells, such as the bladder type and self-sealing type of fuel cells, fittings for fuel cells, hose and tubes, belts, tires, shoe soles and heels and so forth. Moreover, while the present invention has been described with particular reference to sheets of fuel-resistant rubber coated with a finely divided or particulate polymer containing haloethylene, it is apparent that it will apply to coated fuel-resistant rubber films, tapes, ribbons and so forth as well as to more massive or thicker articles and to articles of intricate shape. Furthermore, although the drawings and portions of the specification refer to laminates of only one or two layers, it is apparent that laminates of a plurality of layers, i.e., four, five, six or more can be obtained according to the methods of the present invention.

The following examples will serve to illustrate the invention with more particularity to those skilled in the art:

Example 1

A fuel-resistant rubber composition was prepared by mixing together on the rolls of a rubber mill a major amount of a copolymer of about 61% by weight of butadiene-1,3 and the balance essentially acrylonitrile, and minor amounts of sulfur, accelerator, antioxidant, reinforcing pigment and plasticizer. The rubber composition was then sheeted out on different rolls and calendered on opposite sides of a tensioned sheet of open-mesh (Leno weave) nylon fabric slightly less in width than the width of the rubber sheets. The composite sheet was then dusted on each side with dry, finely divided, unplasticized polyvinyl chloride to form a continuous, relatively thin coating on the sheet. The dusted sheet then was calendered and wound up on a mandrel under tension with a nylon liner. After the mandrel had been wound up with several yards of the nylon liner escaped polyvinyl chloride dusted reinforced nitrile rubber sheet, it was sealed on all sides to prevent entry of air and cured in a pressure autoclave one hour at 290° F. After cure, the nylon liner was readily stripped from the composite sheet which was flexible, strong and tough. The surface of the composite sheet exhibited a plurality of tiny white dots of polyvinyl chloride and was substantially covered with polyvinyl chloride particles. After room temperature aging tests, the surface of the nitrile rubber did not exhibit the typical surface oxidation of a cured and aged nitrile rubber having no surface coating or treatment as described herein. Pieces of the coated cured sheets could not be sealed together under heat and pressure. However, pieces of the surface treated cured stock could be bonded together by means of an uncured strip of the same nitrile rubber composition as previously used except that it was highly accelerated and its surface was uncoated. The strip was disposed between adjacent sheets of the polyvinyl chloride particle coated rubber and the assembly placed in an electronic sealer for 15 seconds and then allowed to complete curing in air at room temperature for about two days. At the end of this time, the bonded sheets were tested and it was found that the individual composite rubber sheets of the laminated article tore before a rupture occurred through the bond or seam. Moreover, no separation of the sheets occurred at the bond when tested in gasoline. Reheating at the point of bonding did not cause a softening of the material to permit separation of the sheets, indicating that the bond or seal was not thermoplastic.

Example 2

This example was the same as Example 1 above except that a finely-divided polymer of vinylidene chloride (Saran F-120, made by the Dow Chemical Company) was used in place of finely-divided polyvinyl chloride. The results obtained on test were essentially the same as those reported under Example 1 above.

Example 3

In the method of this example relatively narrow strips of the nitrile rubber of Example 1 above were calendered on each side of a slightly narrower strip of open mesh nylon fabric. The resulting composite strip was then dusted with the polyvinyl chloride powder of Example 1 above. The dusted composite strip was then spirally tightly wrapped around a mandrel with the edges overlapping somewhat to form a tube. The assembly was then tightly wrapped with a woven nylon cover and placed in a steam mold and cured. At the end of the cure, the nylon cover and tube were removed from the mandrel and the nylon cover easily separated from the now cured tube. The seams of the tube were strong. It was tested for gasoline resistance and exhibited the same results as the composite bonded article of Example 1 above.

In summary, the present invention teaches that a fuel-resistant rubber having an adherent, relatively thin and continuous or substantially continuous coating of a finely-divided or particulate haloethylene containing polymer can be cured to itself and/or after curing can readily be released from molds or curing liners without sticking or injury to the surface of the rubber and does not exhibit surface oxidation as compared to a nitrile rubber surface which has not been coated as described herein. After cure, sheets of said cured coated rubber can readily be joined to each other through the medium of a curable rubber bonding layer to provide bonds or seams which are strong and durable and which will not separate after long immersion in gasoline. It is unnecessary to buff the cured sheets prior to joining them together and then to use them immediately to avoid danger of oxidation. The articles and methods of the present invention will find great utility in the production of gasoline storage tank diaphragms, fuel cells, gasoline hose, shoe soles and heels subject to atack by gasoline, oil and the like and in various other articles.

What is claimed is:

1. An article comprising vulcanized nitrile rubber having embedded in its surface a substantially continuous layer of fine particles of an unplasticized polymer in which the predominant monomer is a haloethylene having from 1 to 2 halogen atoms on only one carbon atom.

2. An article as defined in claim 1 in which the fine particles consist essentially of polyvinyl chloride.

3. An article comprising parts made from vulcanized nitrile rubber material having embedded in its surface a substantially continuous layer of fine particles of an unplasticized polymer in which the predominant monomer is a haloethylene having from 1 to 2 halogen atoms on only one carbon atom, which parts are joined by a layer of vulcanized nitrile rubber directly bonded to the embedded fine particles.

4. An article as defined in claim 3 in which the fine particles consist essentially of polyvinyl chloride.

5. The method which comprises applying to substantially the entire surface of unvulcanized nitrile rubber a layer of fine particles of an unplasticized polymer in which the predominant monomer is a haloethylene having from 1 to 2 halogen atoms on only one carbon atom, and vulcanizing the nitrile rubber.

6. The method of claim 5 in which the fine particles consist essentially of polyvinyl chloride.

7. The method which comprises applying to substantially the entire surface of a sheet of unvulcanized nitrile rubber a layer of fine particles of an unplasticized polymer in which the predominant monomer is a haloethylene having from 1 to 2 halogen atoms on only one carbon atom, vulcanizing the nitrile rubber, forming an article by lapping margins of the vulcanized sheet material with a layer of vulcanizable nitrile rubber between them, and vulcanizing the layer of nitrile rubber.

8. The method of claim 7 in which the fine particles consist essentially of polyvinyl chloride.

References Cited in the file of this patent

UNITED STATES PATENTS

| | | |
|---|---|---|
| 2,298,522 | Waters | Oct. 12, 1942 |
| 2,355,919 | Lipsius | Aug. 15, 1944 |
| 2,381,739 | Gray | Aug. 7, 1945 |
| 2,430,931 | Hershberger | Nov. 18, 1947 |
| 2,443,678 | Garvey | June 22, 1948 |
| 2,451,911 | Braden | Oct. 19, 1948 |
| 2,459,955 | Morrison et al. | Jan. 25, 1949 |
| 2,497,123 | Frolich | Feb. 14, 1950 |
| 2,570,829 | Maxey | Oct. 9, 1951 |
| 2,601,525 | Howald et al. | June 24, 1952 |
| 2,711,985 | Olson | June 28, 1955 |
| 2,715,085 | Boger | Aug. 9, 1955 |
| 2,732,324 | Morris | Jan. 24, 1956 |
| 2,825,661 | Dosemann | Mar. 4, 1958 |

UNITED STATES PATENT OFFICE
CERTIFICATE OF CORRECTION

Patent No. 2,992,957                          July 18, 1961

Edwin M. Maxey

It is hereby certified that error appears in the above numbered patent requiring correction and that the said Letters Patent should read as corrected below.

Column 7, line 19, for "escaped" read -- encased --; column 8, line 20, for "atack" read -- attack --.

Signed and sealed this 1st day of May 1962.

(SEAL)
Attest:

ERNEST W. SWIDER
Attesting Officer

DAVID L. LADD
Commissioner of Patents